Patented June 4, 1929.

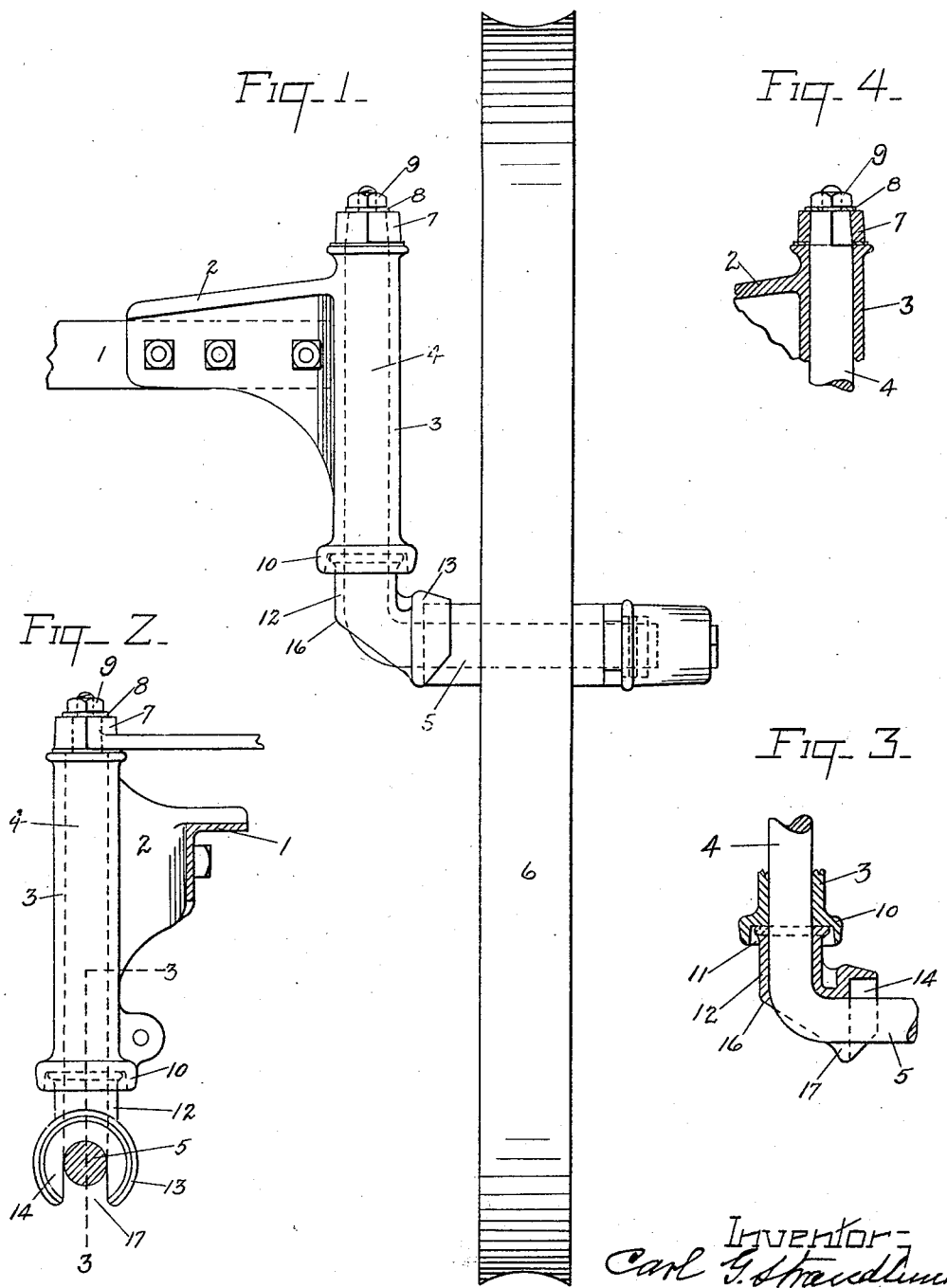

1,715,394

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

SAND BOX FOR CULTIVATORS.

Application filed January 5, 1927. Serial No. 159,220.

My invention relates to improvements in wheel mountings, more particularly as utilized with wheels of cultivators and similar implements, and has for its object protection of the wheel bearing from sand and dust by providing a sand box of a particular conformation.

Referring to the drawings in which similar numerals indicate identical parts:

Figure 1 is a view of a cultivator wheel and its mountings on a cultivator, part of the frame of the latter being shown together with my improved sand box;

Figure 2 is a side view of Figure 1 with the wheel removed and the wheel spindle in section;

Figure 3 is a vertical section on the line 3—3 of Figure 2, and

Figure 4 is a detail section.

Sufficient of the frame 1 of a cultivator is shown to which is bolted a casting 2 having integral therewith a vertical sleeve 3. Journaled rotatably in the sleeve 3 is a vertical spindle 4 of a crank axle, its lower portion presenting a horizontal spindle 5 on which the wheel 6 is supported. The upper end of the spindle 4 is reduced and squared, and mounted thereon is a collar 7, secured in place by a washer 8 and nut 9, the collar resting on the sleeve 3 and forming part of the steering mechanism of the implement. The lower end 10 of the sleeve 3 is enlarged and has a recess 11 to receive the upper end of my improved sand box 12.

The sand box 12 is a casting conforming to the bend of the axle, and has a vertical enlargement 13 with a recess 14 into which the hub 15 of the wheel 6 extends. From a point 16 on the sand box, the latter is open downwardly toward the wheel, as more clearly shown in Figures 2 and 3, so that in assembling the parts the sand box is readily mounted on the spindle 4 before the casting 2 is secured thereon, the box, by reason of the lower opening 17, sliding readily to place upon the spindle 4 until it rests upon the horizontal spindle 5, supporting the casting 2 and attached parts.

As previously stated, the inner end of the wheel hub extends into the recess 14 of the box, the wheel 6 being secured upon the spindle 5 in any desired manner. It will be apparent that the sand box 12 supports the weight of the sleeve 3 and attached parts, and at the same time excludes sand and dirt carried up by the wheel 6, in the rotation of the wheel, and dropping upon the inner portion of the hub.

What I claim is—

1. In a wheeled vehicle having a vertical sleeve secured thereon; the combination therewith of a crank axle having a spindle journaled rotatably in the sleeve, and a second spindle disposed at an angle to the first mentioned spindle; a ground wheel on the second spindle, and a sand box on the crank axle at the bend thereof, conforming to the bend, and open on its under side.

2. In a wheeled vehicle having a vertical sleeve secured thereon; the combination therewith of a crank axle having a spindle journaled rotatably in the sleeve, and a second spindle disposed at an angle to the first mentioned spindle; a ground wheel on the second spindle; a circumferential recess in the lower end of the sleeve; a sand box on said crank axle, at the bend thereof, having its upper end in the recess and supporting the sleeve, said sand box conforming to the bend of the axle and open on its under side.

3. In a wheeled vehicle having a vertical sleeve secured thereon; the combination therewith of a crank axle having a spindle journaled rotatably in the sleeve, and a second spindle disposed at an angle to the first mentioned spindle; a circumferential recess in the lower end of the sleeve; a sand box on the crank axle at the bend thereof, having its upper end in the recess and supporting the sleeve, the sand box conforming to the bend of the axle and open on its under side; and a recess in the end of the sand box, adjacent the wheel, to receive an end of the wheel hub.

CARL G. STRANDLUND.